United States Patent
Bau

(10) Patent No.: US 12,462,545 B2
(45) Date of Patent: Nov. 4, 2025

(54) CONTROLLABLE NEURAL NETWORKS OR OTHER CONTROLLABLE MACHINE LEARNING MODELS

(71) Applicant: Samsung Electronics Co., Ltd., Suwon-si (KR)

(72) Inventor: Tien Cheng Bau, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 639 days.

(21) Appl. No.: 17/870,011

(22) Filed: Jul. 21, 2022

(65) Prior Publication Data
US 2023/0040176 A1 Feb. 9, 2023

Related U.S. Application Data

(60) Provisional application No. 63/230,435, filed on Aug. 6, 2021.

(51) Int. Cl.
*G06V 10/82* (2022.01)
*G06N 3/045* (2023.01)
*G06T 3/4053* (2024.01)
*G06V 10/26* (2022.01)

(52) U.S. Cl.
CPC .......... *G06V 10/82* (2022.01); *G06N 3/045* (2023.01); *G06T 3/4053* (2013.01); *G06V 10/26* (2022.01)

(58) Field of Classification Search
CPC ...... G06V 10/82; G06V 10/26; G06V 10/774; G06N 3/045; G06N 3/0475; G06N 3/09; G06N 3/094; G06N 20/00; G06T 3/4053
See application file for complete search history.

(56) References Cited

U.S. PATENT DOCUMENTS

| 2018/0075581 | A1* | 3/2018 | Shi | ............... G06N 3/045 |
| 2020/0050929 | A1* | 2/2020 | Leobandung | ...... G06N 3/065 |
| 2021/0063518 | A1* | 3/2021 | Zhang | ......... G01R 33/5608 |
| 2021/0142162 | A1 | 5/2021 | Jeon et al. | |

(Continued)

OTHER PUBLICATIONS

Ledig et al., "Photo-Realistic Single Image Super-Resolution Using a Generative Adversarial Network," 2017 IEEE Conference on Computer Vision and Pattern Recognition, Jul. 2017, 10 pages.

(Continued)

*Primary Examiner* — Molly Wilburn

(57) ABSTRACT

A method includes obtaining (such as accessing, receiving, acquiring, etc.), using at least one processor of an electronic device, a machine learning model trained to process input data and generate output data over at least one range of values associated with one or more control variables. The method also includes providing, using the at least one processor, specified input data to the machine learning model and providing, using the at least one processor, one or more specified values of the one or more control variables to the machine learning model. The one or more specified values of the one or more control variables are within the at least one range of values. The method further includes performing inferencing using the machine learning model to process the specified input data and generate specified output data. The inferencing is controlled based on the one or more specified values of the control variable(s).

29 Claims, 10 Drawing Sheets

(56) References Cited

U.S. PATENT DOCUMENTS

2021/0224673 A1   7/2021  Turner et al.
2021/0233210 A1*  7/2021  Elron .................... G06T 3/4046

OTHER PUBLICATIONS

Wang et al., "ESRGAN: Enhanced Super-Resolution Generative Adversarial Networks," European Conference on Computer Vision 2018 Workshops, Sep. 2018, 16 pages.

Blau et al., "The 2018 PIRM Challenge on Perceptual Image Super-resolution," European Conference on Computer Vision 2018 Workshops, Sep. 2018, 22 pages.

* cited by examiner

CONTROLLABLE NEURAL NETWORKS OR OTHER CONTROLLABLE MACHINE LEARNING MODELS

CROSS-REFERENCE TO RELATED APPLICATION AND PRIORITY CLAIM

This application claims priority under 35 U.S.C. § 119(e) to U.S. Provisional Patent Application No. 63/230,435 filed on Aug. 6, 2021. This provisional application is hereby incorporated by reference in its entirety.

TECHNICAL FIELD

This disclosure relates generally to machine learning systems. More specifically, this disclosure relates to controllable neural networks or other controllable machine learning models.

BACKGROUND

Machine learning models, such as deep neural networks and other neural networks, can be trained to perform a wide variety of functions. For example, neural networks and other machine learning models have been trained to perform a number of image processing operations, which often involve receiving and processing images of scenes. However, once a machine learning model is trained, the outputs of the machine learning model are typically deterministic, which means that the outputs do not vary when the same input data is provided to the machine learning model. The outputs of the machine learning model generally cannot be adjusted in a controllable manner.

SUMMARY

This disclosure relates to controllable neural networks or other controllable machine learning models.

In a first embodiment, a method includes obtaining (such as accessing, receiving, acquiring, etc.), using at least one processor of an electronic device, a machine learning model trained to process input data and generate output data over at least one range of values associated with one or more control variables. The method also includes providing, using the at least one processor, specified input data to the machine learning model. The method further includes providing, using the at least one processor, one or more specified values of the one or more control variables to the machine learning model, where the one or more specified values of the one or more control variables are within the at least one range of values. In addition, the method includes performing inferencing using the machine learning model to process the specified input data and generate specified output data, where the inferencing is controlled based on the one or more specified values of the one or more control variables.

In a second embodiment, an apparatus includes at least one processing device configured to obtain (such as access, receive, acquire, etc.) a machine learning model trained to process input data and generate output data over at least one range of values associated with one or more control variables. The at least one processing device is also configured to provide specified input data to the machine learning model and provide one or more specified values of the one or more control variables to the machine learning model, where the one or more specified values of the one or more control variables are within the at least one range of values. The at least one processing device is further configured to perform inferencing using the machine learning model to process the specified input data and generate specified output data, where the inferencing is controlled based on the one or more specified values of the one or more control variables.

In a third embodiment, a non-transitory computer readable medium contains instructions that when executed cause at least one processor of an electronic device to obtain (such as access, receive, acquire, etc.) a machine learning model trained to process input data and generate output data over at least one range of values associated with one or more control variables. The medium also contains instructions that when executed cause the at least one processor to provide specified input data to the machine learning model and provide one or more specified values of the one or more control variables to the machine learning model, where the one or more specified values of the one or more control variables are within the at least one range of values. The medium further contains instructions that when executed cause the at least one processor to perform inferencing using the machine learning model to process the specified input data and generate specified output data, where the inferencing is controlled based on the one or more specified values of the one or more control variables.

In a fourth embodiment, a method includes providing, using at least one processor of an electronic device, training data to a machine learning model. The method also includes providing, using the at least one processor, values of one or more control variables to the machine learning model. The method further includes training the machine learning model using the training data and the values of the one or more control variables. In addition, the method includes varying the values of the one or more control variables during the training of the machine learning model in order to train the machine learning model to process input data and generate output data over at least one range of values associated with the one or more control variables. In other embodiments, an apparatus may include at least one processing device configured to perform the method of the fourth embodiment. In still other embodiments, a non-transitory computer readable medium may contain instructions that when executed cause at least one processor of an electronic device to perform the method of the fourth embodiment.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC®, APPLETV™, or GOOGLE TV™), a smart speaker or speaker with an integrated digital assistant (such as SAMSUNG GALAXY HOME®, APPLE HOMEPOD™, or AMAZON ECHO™), a gaming console (such as an XBOX™, PLAYSTATION™, or NINTENDO™), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(t) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
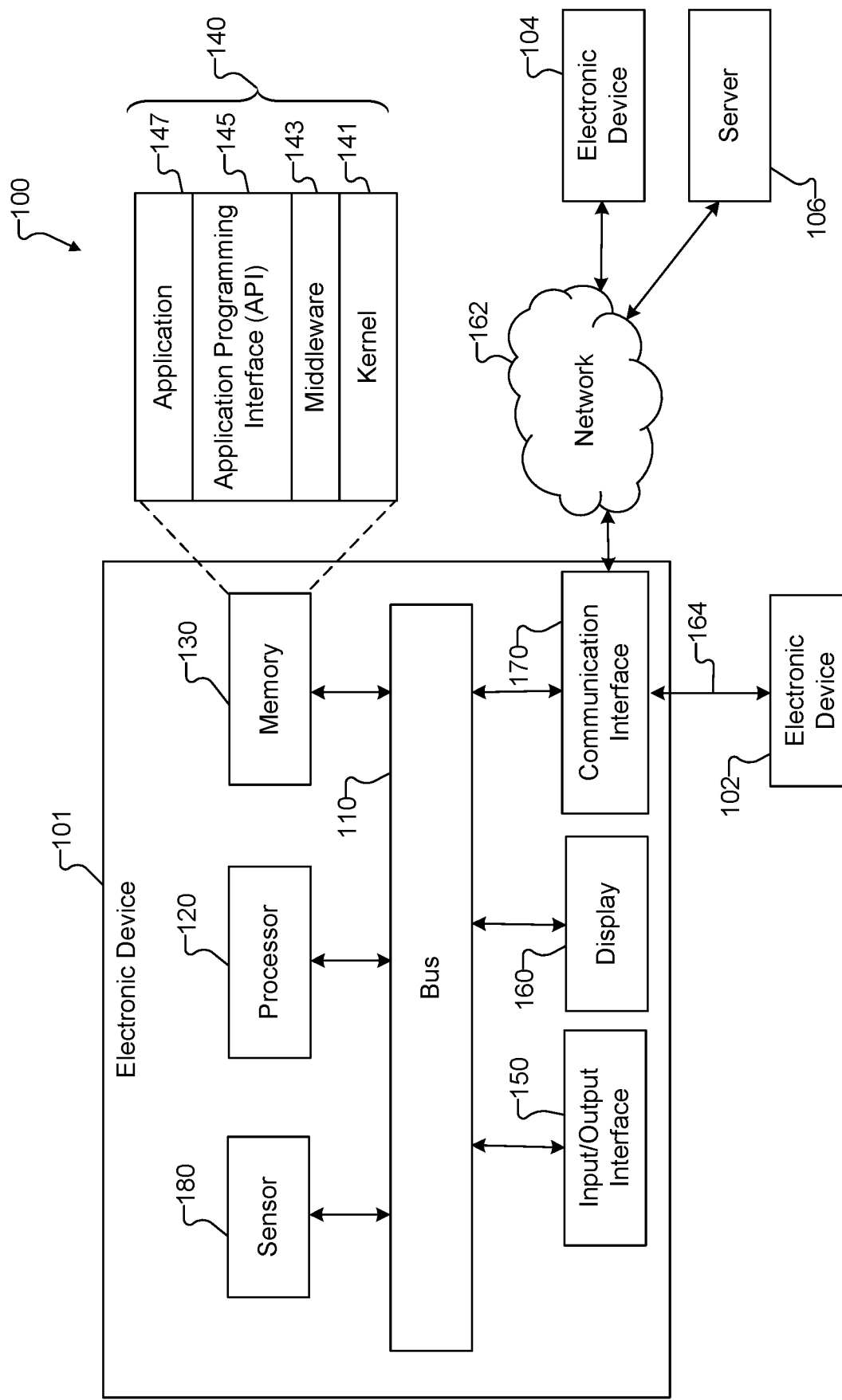
FIG. 1 illustrates an example network configuration including an electronic device in accordance with this disclosure.

FIGS. 1 through 10, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, machine learning models, such as deep neural networks and other neural networks, can be trained to perform a wide variety of functions. For example, neural networks and other machine learning models have been trained to perform a number of image processing operations, which often involve receiving and processing images of scenes. However, once a machine learning model is trained, the outputs of the machine learning model are typically deterministic, which means that the outputs do not vary when the same input data is provided to the machine learning model. The outputs of the machine learning model generally cannot be adjusted in a controllable manner.

Some approaches have attempted to train a single neural network or other machine learning model so that the machine learning model can be used over a wide variety of conditions. However, these approaches tend to be time consuming, and machine learning models trained in this manner typically do not perform well in very diversified real-world use cases. Other approaches have attempted to train multiple neural networks or other machine learning models under different conditions, where outputs from the machine learning models are interpolated, blended, or otherwise combined. However, training multiple machine learning models is more time consuming than training a single model and requires the use of multiple training datasets. Also, the use of multiple machine learning models typically increases the amount of memory (and therefore the size and cost) of a device, and different machine learning models can generate different discrete results (rather than smoothly transitioning between results) when processing the same input data.

This disclosure provides various controllable neural networks or other controllable machine learning models. As described in more detail below, one or more control variables can be added as inputs to a neural network or other machine learning model. During training, values of the one or more control variables can be varied over at least one range of values, and the neural network or other machine learning model can be trained using training data and the varying values of the one or more control variables. This allows a single machine learning model to be trained over a range of possible conditions. The trained machine learning model can then be placed into operation and used for inferencing. During inferencing, one or more specified values of the one or more control variables can be provided to the trained machine learning model along with input data to be processed. The one or more specified values of the one or more control variables can be within the at least one range of values, and the inferencing can be controlled based on the one or more specified values of the one or more control variables.

In this way, a single controllable neural network or other controllable machine learning model can be trained to perform inferencing over a range of conditions, and the specific condition(s) to be used during inferencing can be easily controlled by setting the one or more control variables to one or more suitable values. As a result, this approach involves training a single machine learning model, which can simplify the training process. Moreover, since a single machine learning model may be used for inferencing, this can reduce the memory requirements for inferencing operations and can avoid sharp changes in inferencing results (compared to the use of multiple machine learning models). In addition, the performance of the single controllable machine learning model can rival the performance of multiple machine learning models trained under different conditions.

In the following discussion, it may often be assumed that a single controllable neural network or other controllable machine learning model is trained and used to perform one or more image processing operations. Specific examples of image processing operations described below include super-resolution, object detection, object recognition, and image segmentation. However, controllable machine learning models are not limited to use with these specific image processing operations, and controllable machine learning models may be trained to perform any other suitable image processing operation(s). In fact, controllable machine learning models are not limited to use with image processing operations, and controllable machine learning models may be trained to perform any other suitable operation(s).

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). In some cases, the processor 120 can be used to train and/or use one or more controllable neural networks or other controllable machine learning models as discussed below.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for training and/or using one or more controllable neural networks or other controllable machine learning models. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 may include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infra-red (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some cases, the server 106 can train and/or use one or more controllable neural networks or other controllable machine learning models as discussed below.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
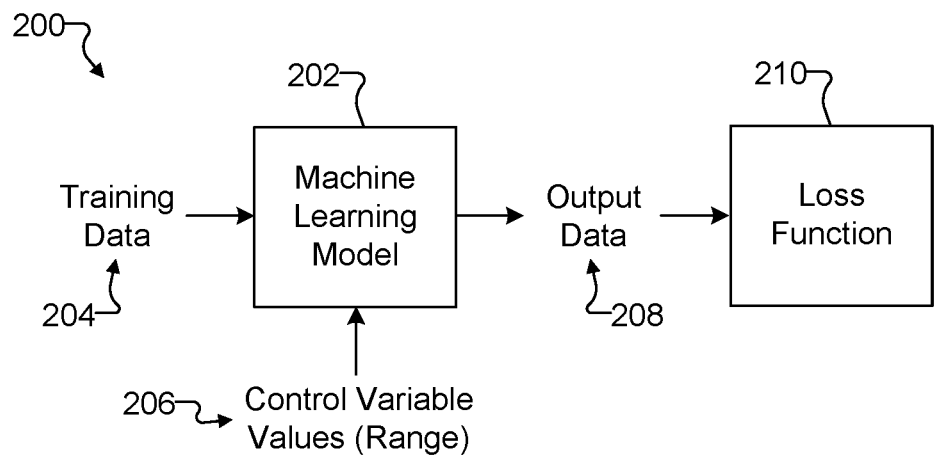
FIGS. 2A and 2B illustrate example techniques for training and using a controllable neural network or other controllable machine learning model according to this disclosure.
Figure 2B:
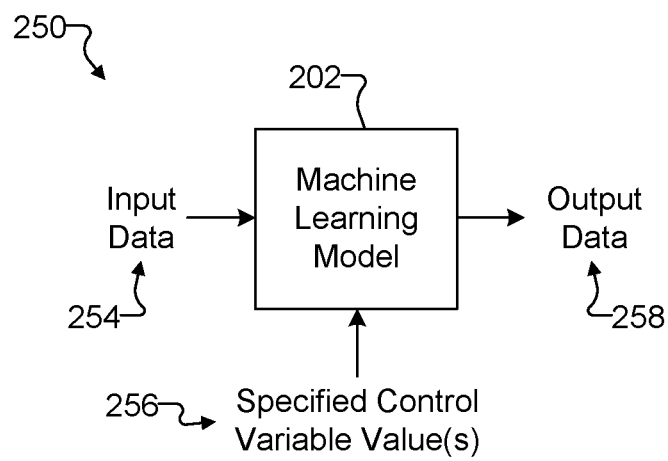

FIGS. 2A and 2B illustrate example techniques 200, 250 for training and using a controllable neural network or other controllable machine learning model 202 according to this disclosure. In particular, FIG. 2A illustrates an example technique 200 for training a controllable machine learning model 202, and FIG. 2B illustrates an example technique 250 for using a controllable machine learning model 202. For ease of explanation, the techniques 200, 250 shown in FIGS. 2A and 2B are described as being implemented on or supported by the electronic device 101 in the network configuration 100 of FIG. 1. However, the techniques 200, 250 shown in FIGS. 2A and 2B could be used with any other suitable device and in any other suitable system, such as when one or more of the techniques 200, 250 is implemented on or supported by the server 106. As a particular example, the server 106 may be used to train the controllable machine learning model 202, and the trained machine learning model 202 may be deployed to one or more electronic devices (including the electronic device 101) for use.

As shown in FIG. 2A, the machine learning model 202 may be trained to perform one or more desired functions. The machine learning model 202 may represent any suitable logical structure configured to support machine learning, such as a deep neural network or other neural network or other form of machine learning model. The machine learning model 202 is trained here by providing training data 204 to the machine learning model 202. The training data 204 generally includes data to be processed by the machine learning model 202 and desired or expected results to be generated by the machine learning model 202. The desired or expected results are often referred to as "ground truths," and the machine learning model 202 is typically trained to generate these desired or expected results (at least to within some threshold amount of accuracy). The machine learning model 202 can be trained to generate the desired or expected results using any suitable machine learning technique, such as adjusting weights or other parameters of the machine learning model 202 until the machine learning model 202 generates suitably-accurate results.

The training data 204 that is used here can vary widely based on the purpose or use of the machine learning model 202. For example, the machine learning model 202 may be trained to perform one or more image processing operations, and the training data 204 can include image data and other data used to support training of the machine learning model 202 to perform the image processing operation(s). As particular examples, a super-resolution image processing operation generally involves using the machine learning model 202 to process image data contained in input images in order to generate output images having higher resolutions. For super-resolution image processing, the training data 204 may include lower-resolution training images (used as input data) and higher-resolution images (used as ground truths), and the machine learning model 202 is trained to process the lower-resolution training images and generate images matching or similar to the higher-resolution images. An object detection image processing operation generally involves using the machine learning model 202 to process image data from input images in order to detect objects within the input images. For object detection image processing, the training data 204 may include training images containing objects (used as input data) and known object positions within the training images (used as ground truths), and the machine learning model 202 is trained to process the training images and identify objects matching or similar to the known objects. An object recognition image processing operation generally involves using the machine learning model 202 to process image data from input images in order to identify or recognize objects or types of objects within the input images. For object recognition image processing, the training data 204 may include training images containing objects (used as input data) and known types of objects within the training images (used as ground truths), and the machine learning model 202 is trained to process the training images and identify object types matching or similar to the known object types. A segmentation image processing operation generally involves using the machine learning model 202 to process image data from input images in order to segment the images into different regions, such as regions that are associated with foregrounds, backgrounds, and objects. For segmentation image processing, the training data 204 may include training images (used as input data) and known segmentations of the training images (used as ground truths), and the machine learning model 202 is trained to process the training images and identify segmentations matching or similar to the known segmentations. Note, however, that the machine learning model 202 can be trained to perform any other suitable function(s), and the training data 204 used to train the machine learning model 202 can vary based on the function(s). One other non-limiting example of training data 204 that may be used here could include time-series data.

One or more additional inputs are used with the machine learning model 202 to receive values 206 of one or more control variables. As described in more detail below, the one or more control variables represent hyper-parameters or data-specific properties that are added as additional inputs to the machine learning model 202. The one or more control variables are used to teach the machine learning model 202 how to process the training data 204 and generates corresponding output data 208. In order words, the machine learning model 202 can be trained to produce different output data 208 for the same training data 204 by varying the values 206 of the one or more control variables. Thus, for example, the machine learning model 202 can be trained to provide different levels of sharpening, blurring, or other characteristics in the output data 208 for the same training data 204, where the different levels of sharpening, blurring, or other characteristics can be controlled using the values 206 of the one or more control variables. Specific examples of how the one or more control variables can be used are provided below.

By varying the values 206 of the one or more control variables during training, the machine learning model 202 learns how the values 206 of the one or more control variables translate into different results in the output data 208, allowing the behavior of the machine learning model 202 to be adjusted or controlled using the one or more control variables. Effectively, the one or more control variables can be used to configure the training session or configure the network topology of the machine learning model 202. Often times, the one or more control variables may be referred to as "hyper-parameters" in order to distinguish the one or more control variables from the parameters used in the machine learning model 202. Here, the one or more control variables are shown as having at least one range of values 206, meaning the values 206 of each control variable may vary between high and low values. Depending on the implementation, the values 206 of each control variable may vary continuously, vary by regular or irregular intervals, include discrete values, or otherwise include multiple values spanning some specified range. Each range therefore indicates that the values 206 of the associated control variable may be adjusted over a specified numerical or other range of values 206 during the training. Using a range of values 206 for each control variable can help train the machine learning model 202 for use across a wide range of conditions that might be experienced by the machine learning model 202 after deployment.

In this example, the output data 208 that is generated by the machine learning model 202 is processed using a loss function 210, which is used to calculate loss values for the machine learning model 202 during training. The loss values can indicate the losses or differences between the output data 208 generated by the machine learning model 202 and the known ground truths. Ideally, the parameters of the machine learning model 202 are modified during the training over time so that the loss values become smaller (typically until at least a threshold loss level is achieved or a specified number of training iterations or time period for training is met). The loss function 210 can therefore ideally be used to set a goal to be met during the training of the machine learning model 202. In some cases, the loss function 210 can be controlled using weights or other values, such as when the loss function 210 is a summation of different types of losses and weights allow the different types of losses to be weighted appropriately.

As shown in FIG. 2B, once the machine learning model 202 has been adequately trained, the machine learning model 202 can be placed into operation and used for inferencing. During inferencing, specified input data 254 is provided to the machine learning model 202 along with one or more specified values 256 for the one or more control variables. The machine learning model 202 processes the specified input data 254 and the one or more specified values 256 for the one or more control variables in order to generate specified output data 258 based on the input data 254.

As noted above, the machine learning model 202 may be trained to perform any number of functions, such as one or more image processing functions. As a result, the specified input data 254 may include any suitable type(s) of content, such as image data, time-series data, or other data to be processed. Here, the specified value 256 for each control variable may fall within the associated range of values 206 for which the machine learning model 202 was trained. Because of this, the one or more specified values 256 for the one or more control variables can be used to identify the specific condition under which the machine learning model 202 is being used. This allows the inferencing that is performed by the machine learning model 202 to be controlled based on the one or more specified values 256 of the one or more control variables. In other words, the output data 258 that is generated by the machine learning model 202 is not necessarily deterministic based solely on the specified input data 254. Rather, the output data 258 that is generated by the machine learning model 202 can be controlled using the one or more specified values 256 of the one or more control variables.

In this way, one or more control variables can be added as one or more additional inputs to the machine learning model 202 (in addition to the one or more original inputs used to receive the training data 204/input data 254). During training, the values 206 of the control variable(s) can be varied to cover one or more ranges to thereby train the machine learning model 202 over a number of conditions. This may allow, for example, weights between loss functions, image blur levels, image noise levels, or other conditions to be varied during training. This approach therefore enables training the machine learning model 202 over a range of conditions in the same training session. During inferencing, the one or more additional inputs to the machine learning model 202 are used to control the inferencing and obtain a desired output or type of output from the machine learning model 202. For instance, an estimation of the image quality of an input image in the input data 254 may be obtained and used as a specified value 256 for a control variable, so the image quality estimate can be used to control how the machine learning model 202 performs inferencing to support an image processing operation. This enables the machine learning model 202 to be controllable in ways not previously possible.

This type of approach may be used to provide improved machine learning outputs, such as improved image data or other output data 258. Specific examples of how a trained machine learning model can be used to generate image data or other related outputs are provided below. Not only are the results of these improvements visible (such as in image data) and adjustable, there can also be significant benefits in terms of required resources to train and store machine learning models. For example, the machine learning model 202 may be trained in significantly less time and using significantly fewer training sessions since one machine learning model 202 (rather than multiple machine learning models) may be needed here. Also, parameters of the trained machine learning model 202 are often stored in registers of an electronic device 101 or other device in order to support functions such as simultaneous access and computation. The use of multiple machine learning models can therefore necessitate the use of more numerous registers or other storage locations, which can increase the size and cost of an overall device. The ability to provide a single machine learning model 202 for use under different conditions can reduce the number of registers (the "gate count") of a device, thereby reducing the size or cost of the device.

It should be noted that the functions shown in or described with respect to FIGS. 2A and 2B can be implemented in one or more of an electronic device 101, server 106, or other device(s) in any suitable manner. For example, in some embodiments, at least some of the functions shown in or described with respect to FIGS. 2A and 2B can be implemented or supported using one or more software applications or other software instructions that are executed by the processor(s) 120 of the electronic device 101, server 106, or other device(s). In other embodiments, at least some of the functions shown in or described with respect to FIGS. 2A and 2B can be implemented or supported using dedicated hardware components. In general, the functions shown in or described with respect to FIGS. 2A and 2B can be performed using any suitable hardware or any suitable combination of hardware and software/firmware instructions.

Although FIGS. 2A and 2B illustrate one example of techniques 200, 250 for training and using a controllable neural network or other controllable machine learning model 202, various changes may be made to FIGS. 2A and 2B. For example, the machine learning model 202 may have one or multiple inputs for receiving values of one or more control variables.

FIGS. 3A through 8B illustrate example techniques for training and using controllable neural networks or other controllable machine learning models to perform various image processing operations according to this disclosure. More specifically, FIGS. 3A through 8B illustrate specific examples of how controllable machine learning models may be trained and used to perform a number of different image processing functions. However, as noted above, these examples do not limit the scope of this disclosure, and machine learning models may be used to perform any other suitable functions.

Figure 3A:
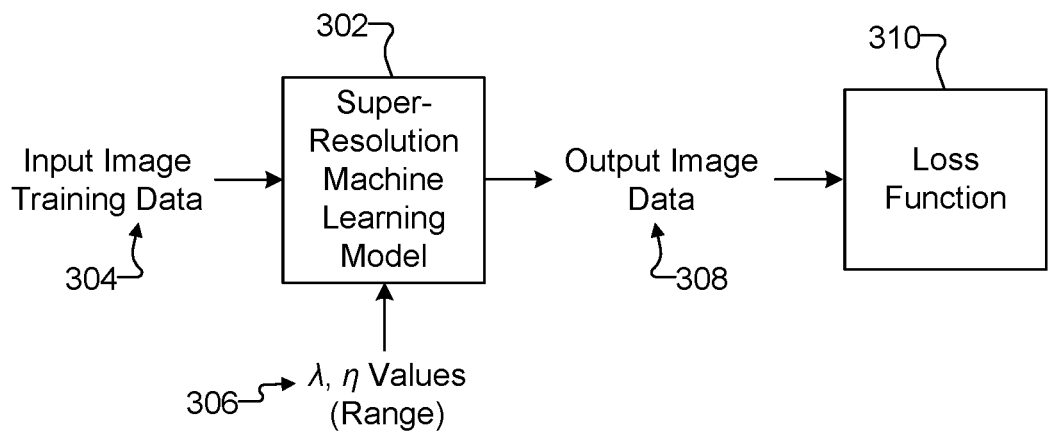
FIGS. 3A through 8B illustrate example techniques for training and using controllable neural networks or other controllable machine learning models to perform various image processing operations according to this disclosure.
Figure 3B:
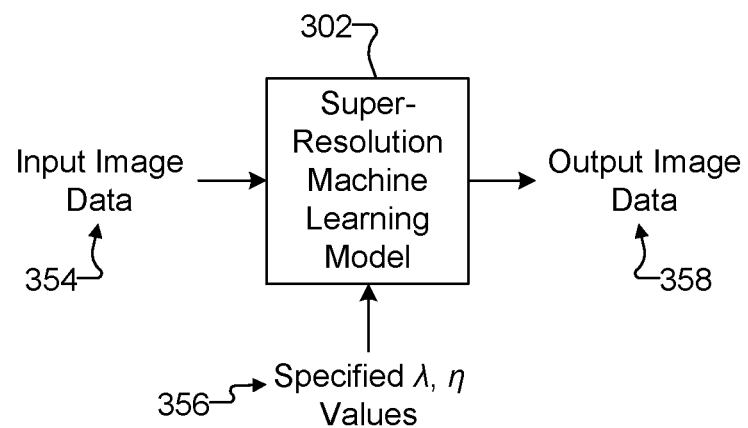

As shown in FIGS. 3A and 3B, a super-resolution machine learning model 302 is trained and used to perform super-resolution. As described above, super-resolution image processing generally involves using the machine learning model 302 to process image data contained in input images (such as still or video images) in order to generate output images having higher resolutions than the input images. Example applications for this functionality may be in digital cameras, video recorders, televisions, computers, satellite image processing systems, and other devices or systems where images are captured or otherwise obtained and then processed to produce images having higher resolutions.

In FIG. 3A, the machine learning model 302 is trained using input image training data 304, which may include both (i) lower-resolution training images and (ii) higher-resolution images that are used as ground truth images. The machine learning model 302 is trained to process the input image training data 304 and at least one range of values 306 for one or two control variables denoted $\lambda$ and $\eta$ (which are described below) in order to generate output image data 308. The machine learning model 302 can be trained so that the output image data 308 matches or closely matches the higher-resolution ground truth images. A loss function 310 can be used to calculates loss values for the machine learning model 302 during the training, where the loss values can indicate the losses or differences between the output image data 308 and the higher-resolution ground truth images. Ideally, parameters of the machine learning model 302 are modified during the training so that the loss values become increasingly smaller over time until at least a threshold loss level is achieved or some other criterion or criteria are met.

In some cases, the machine learning model 302 is trained using a loss function 310 that calculates loss values incorporating different measures or types of losses, and weights can be used to scale the different measures or types of losses when calculating the loss values. As a particular example of this, when training the machine learning model 302 for super-resolution, the loss function 310 may be expressed as follows:

$$L_G = L_{percep} + \lambda L_{GAN} + \eta L_C$$

Here, $L_G$ represents the total loss for the machine learning model 302, which is calculated based on three different measures or types of losses—a perceptual or feature loss ($L_{percep}$), a generative adversarial network (GAN) adversarial loss ($L_{GAN}$), and a content or pixel loss ($L_C$). The values $\lambda$ and $\eta$ here represent loss function weights that are applied to the adversarial loss and to the content or pixel loss, respectively. Note that while the perceptual or feature loss does not include a weight in this equation, the equation can easily be modified to weight the perceptual or feature loss, as well.

The amount of created detail contained in higher-resolution output images based on lower-resolution input images can vary by training a machine learning model with a higher or lower weight $\eta$ for the content or pixel loss or a lower or higher weight $\lambda$ for the adversarial loss (or possibly the weight for the perceptual or feature loss). For example, the amount of one or more textures added to scenes captured in lower-resolution input images to produce the higher-resolution output images can be controlled based on one or both weights $\lambda$ and $\eta$. Ordinarily, a machine learning model is trained by fixing the loss function weights $\lambda$ and $\eta$. This can optimize the machine learning model for that set of weights, but the machine learning model typically generates deterministic outputs and cannot be adjusted. Training more than one machine learning model comes with various difficulties as noted above. Here, the machine learning model 302 can be trained by (among other things) varying the value of $\lambda$ across a range of values 306, varying the value of $\eta$ across a range of values 306, or both.

In FIG. 3B, once the machine learning model 302 has been adequately trained, the machine learning model 302 can be placed into operation and used for inferencing. During inferencing, specified input image data 354 is provided to the machine learning model 302 along with one or more specified values 356 for one or both control variables. The machine learning model 302 processes the specified input image data 354 and the one or more specified values 356 for one or both control variables in order to generate specified output image data 358 based on the input image data 354. The input image data 354 can generally correspond to one or more input images at lower resolution(s), and the output image data 358 can generally correspond to one or more output images at higher resolution(s). The value(s) 356 of the control variable(s) can be used to control the amount of created detail generated by the machine learning model 302 during super-resolution image processing. For instance, the value(s) 356 of the control variable(s) can be used to control the amount of texture creation that occurs during the super-resolution image processing.

As a particular example of this functionality, during training, the values 306 for the control variable $\eta$ may be set to random values or other values within a specified range (such as $\eta=[0, 100]$ or equivalently $\eta=[0.0, 1.0]$). The machine learning model 302 can therefore learn how to correlate this input value with the output image data 308 being generated. Subsequently, during inferencing, the machine learning model's output image data 358 can be controlled using this extra input by specifying one or more specific values for $\eta$. The same or similar type of approach can be used with the control variable $\lambda$ and/or with the weight for the perceptual or feature loss.

Figure 4A:
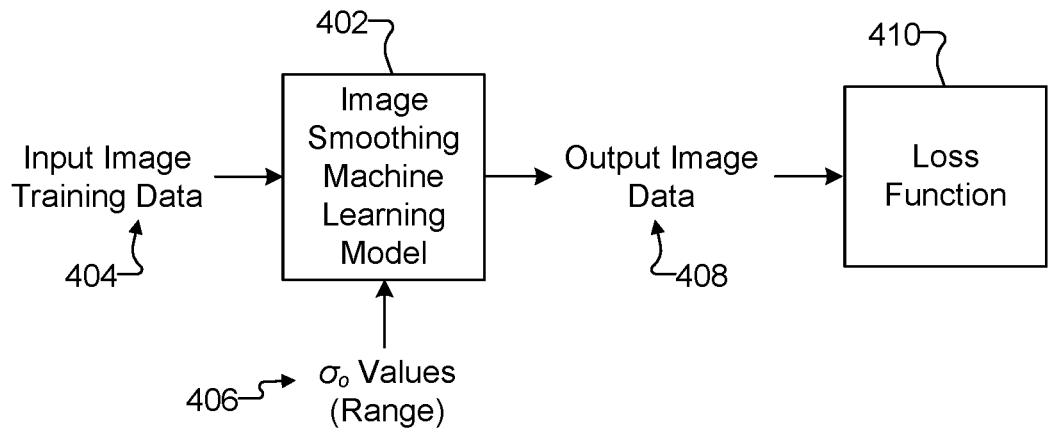
Figure 4B:
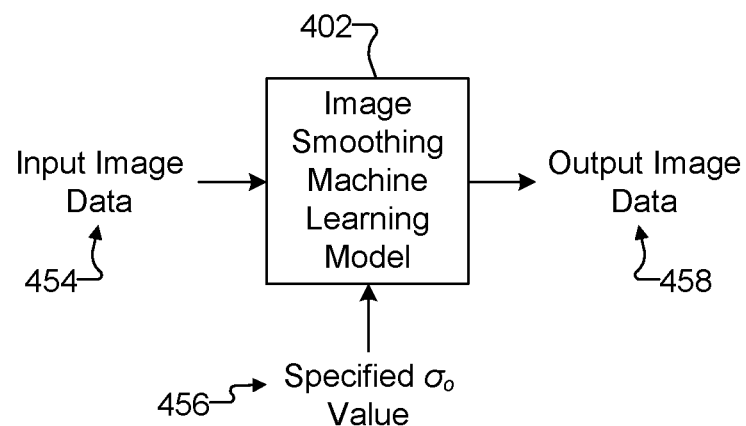

As shown in FIGS. 4A and 4B, an image smoothing machine learning model 402 is trained and used to perform image smoothing. Image smoothing generally involves using the machine learning model 402 to process image data contained in input images (such as still or video images) in order to generate output images having some level of image detail smoothed or removed. Example applications for this functionality may be in digital cameras, image processing systems, and other devices or systems where images of people's faces are captured or otherwise obtained and then processed to produce images having smoothed features.

In FIG. 4A, the machine learning model 402 is trained using input image training data 404, which may include both (i) training images and (ii) ground truth images that are processed to include some amount of blur. The machine learning model 402 is trained to process the input image training data 404 and a range of values 406 for a control variable denoted $\sigma_o$ (which is described below) in order to generate output image data 408. The machine learning model 402 can be trained so that the output image data 408 matches or closely matches the ground truth images. A loss function 410 can be used to calculates loss values for the machine learning model 402 during the training, where the loss values can indicate the losses or differences between the output image data 408 and the ground truth images. Ideally, parameters of the machine learning model 402 are modified during the training so that the loss values become increasingly smaller over time until at least a threshold loss level is achieved or some other criterion or criteria are met.

In some cases, the machine learning model 402 is trained by applying blur to the ground truth images contained in the input image training data 404. This blur causes the ground truth images to lose image details and become smoother in one or more areas. This type of functionality may be useful, for example, when processing images of people's faces in order to smooth the appearances of the people's faces. The machine learning model 402 can be trained to process training images and provide this type of smoothing by modifying the training images according to the desired level of blurring defined by the control variable $\sigma_o$. In some embodiments, the control variable $\sigma_o$ can be used to represent the size of a Gaussian blur kernel that is applied to the ground truth images, where larger blur kernels produce higher amounts of blur and smaller blur kernels produce lower amounts of blur. Varying the value 406 of the control variable $\sigma_o$ during training therefore trains the machine learning model 402 on how to apply varying levels of blur to input images.

In FIG. 4B, once the machine learning model 402 has been adequately trained, the machine learning model 402 can be placed into operation and used for inferencing. During inferencing, specified input image data 454 is provided to the machine learning model 402 along with a specified value 456 for the control variable $\sigma_o$. The machine learning model 402 processes the specified input image data 454 and the specified value 456 for the control variable $\sigma_o$ in order to generate specified output image data 458 based on the input image data 454. The input image data 454 can generally correspond to one or more input images, and the output image data 458 can generally correspond to one or more output images having at least some amount of smoothing or blur applied. The value 456 of the control variable $\sigma_o$ can be used to control the amount of smoothing applied by the machine learning model 402 during image smoothing. For instance, the value 456 of the control variable $\sigma_o$ can be used to control the amount of blurring applied by the machine learning model 402.

Figure 5A:
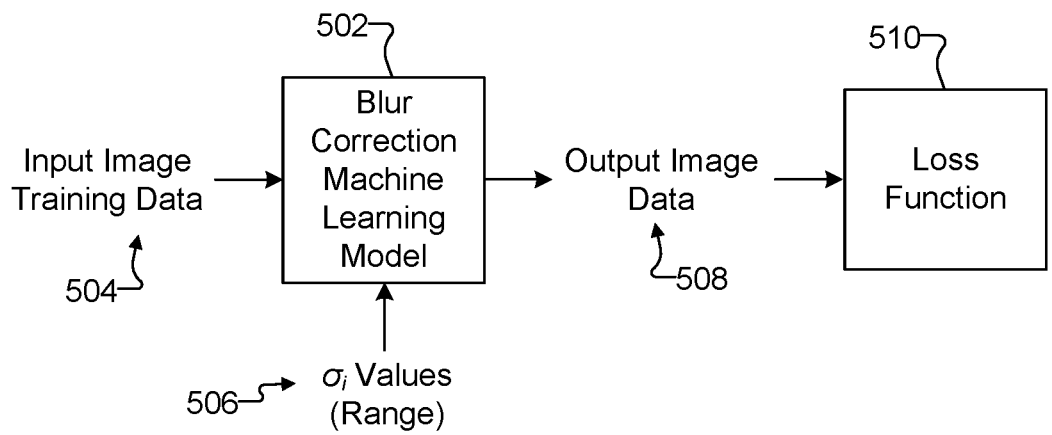
Figure 5B:
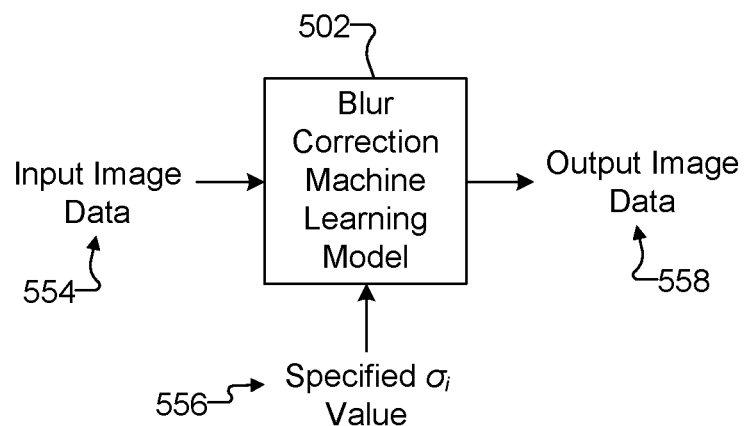

As shown in FIGS. 5A and 5B, a blur correction machine learning model 502 is trained and used to perform blur correction. Blur correction generally involves using the machine learning model 502 to process image data contained in input images (such as still or video images) in order to generate output images that recover some level of image details that are lost due to blur in the input images. Example applications for this functionality may be in digital cameras, video recorders, televisions, computers, satellite image processing systems, and other devices or systems where images containing blur are captured or otherwise obtained and then processed to produce images correcting the blur and recovering at least some of the lost image details.

In FIG. 5A, the machine learning model 502 is trained using input image training data 504, which may include both (i) training images containing blur and (ii) ground truth images containing less or no blur. The machine learning model 502 is trained to process the input image training data 504 and a range of values 506 for a control variable denoted $\sigma_i$ (which is described below) in order to generate output image data 508. The machine learning model 502 can be trained so that the output image data 508 matches or closely matches the ground truth images. A loss function 510 can be used to calculates loss values for the machine learning model 502 during the training, where the loss values can indicate the losses or differences between the output image data 508 and the ground truth images. Ideally, parameters of the machine learning model 502 are modified during the training so that the loss values become increasingly smaller over time until at least a threshold loss level is achieved or some other criterion or criteria are met.

In some cases, the machine learning model 502 is trained by processing the input image training data 504 in order to at least partially remove or correct for blur in the training images. This blur causes image details in the training images to be lost, while the ground truth images may contain these lost image details. The machine learning model 502 can be trained to process the training images and perform detail recovery, where the amounts of blur contained in the training images are defined by the control variable $\sigma_i$. In some embodiments, the control variable $\sigma_i$ can be used to represent the estimated amount of blur contained in each training image, and the amount of blur can affect how aggressively the machine learning model 502 needs to process each training image and recover image details. Varying the value 506 of the control variable $\sigma_i$ during training therefore trains the machine learning model 502 on how to recover image details in the presence of varying levels of blur contained in input images.

In FIG. 5B, once the machine learning model 502 has been adequately trained, the machine learning model 502 can be placed into operation and used for inferencing. During inferencing, specified input image data 554 is provided to the machine learning model 502 along with a specified value 556 for the control variable $\sigma_i$. The machine learning model 502 processes the specified input image data 554 and the specified value 556 for the control variable $\sigma_i$ in order to generate specified output image data 558 based on the input image data 554. The input image data 554 can generally correspond to one or more input images containing blur, and the output image data 558 can generally correspond to one or more output images having at least some amount of image details recovered in order to at least partially correct for the blur. The value 556 of the control variable $\sigma_i$ can be used to estimate the amount of blur in the input image(s), which can be used by the machine learning model 502 during blur correction. For instance, the value 556 of the control variable $\sigma_i$ can be used to control the amount of blur correction applied by the machine learning model 502.

Figure 6A:
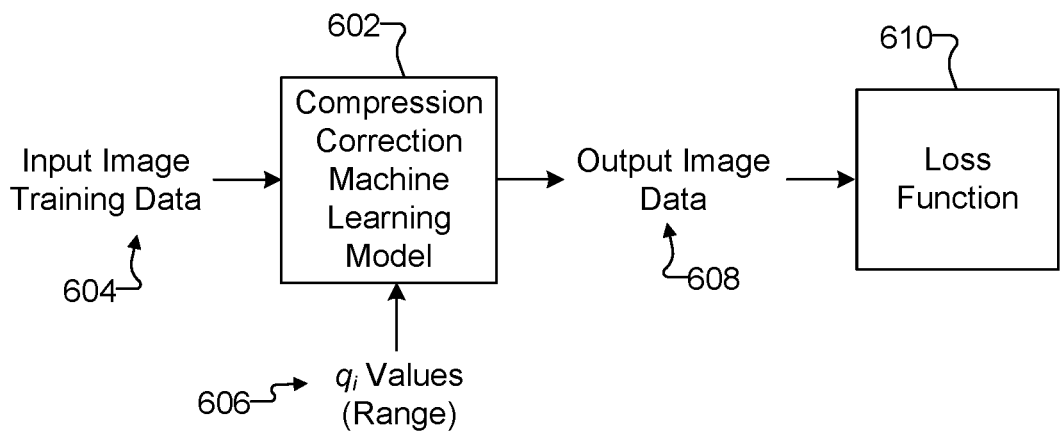
Figure 6B:
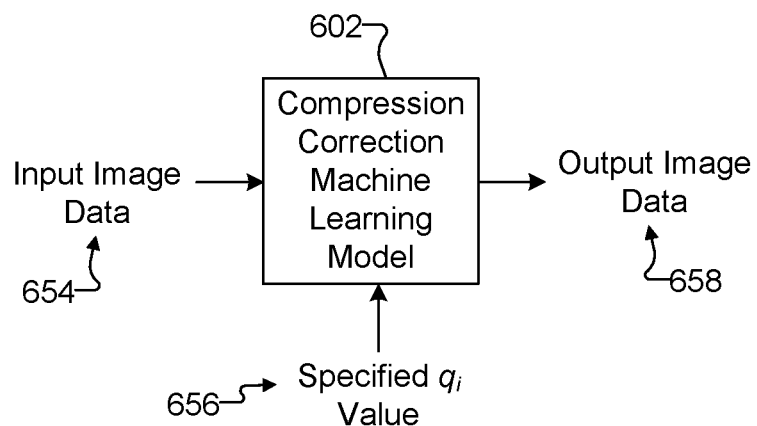

As shown in FIGS. 6A and 6B, a compression correction machine learning model 602 is trained and used to perform compression correction. Compression correction generally involves using the machine learning model 602 to process image data contained in input images (such as still or video images) in order to generate output images that recover some level of image details that are lost due to compression of the input images. Example applications for this functionality may be in digital cameras, video recorders, televisions, computers, satellite image processing systems, and other devices or systems where compressed images are generated or otherwise obtained and then processed to produce images recovering at least some of the image details that are lost due to the compression.

In FIG. 6A, the machine learning model 602 is trained using input image training data 604, which may include both (i) compressed training images and (ii) ground truth images containing little or no compression. The machine learning model 602 is trained to process the input image training data 604 and a range of values 606 for a control variable denoted $q_i$ (which is described below) in order to generate output image data 608. The machine learning model 602 can be trained so that the output image data 608 matches or closely matches the ground truth images. A loss function 610 can be used to calculates loss values for the machine learning model 602 during the training, where the loss values can indicate the losses or differences between the output image data 608 and the ground truth images. Ideally, parameters of the machine learning model 602 are modified during the training so that the loss values become increasingly smaller over time until at least a threshold loss level is achieved or some other criterion or criteria are met.

In some cases, the machine learning model 602 is trained by processing the input image training data 604 in order to at least partially correct for compression of the training images. This compression causes image details in the training images to be lost, while the ground truth images may contain these lost image details. The machine learning model 602 can be trained to process the training images and perform detail recovery, where the amounts of compression used with the training images are defined by the control variable $q_i$ (which is sometimes referred to as a "quality factor" for a compression codec). In some embodiments, the control variable $q_i$ can be used to represent the actual or estimated amount of compression of each training image, and the amount of compression can affect how aggressively the machine learning model 602 needs to process each training image and recover image details. Varying the value 606 of the control variable $q_i$ during training therefore trains the machine learning model 602 on how to recover image details in the presence of varying levels of compression of input images.

In FIG. 6B, once the machine learning model 602 has been adequately trained, the machine learning model 602 can be placed into operation and used for inferencing. During inferencing, specified input image data 654 is provided to the machine learning model 602 along with a specified value 656 for the control variable $q_i$. The machine learning model 602 processes the specified input image data 654 and the specified value 656 for the control variable $q_i$ in order to generate specified output image data 658 based on the input image data 654. The input image data 654 can generally correspond to one or more compressed input images, and the output image data 658 can generally correspond to one or more output images having at least some amount of image details recovered in order to at least partially correct for the compression. The value 656 of the control variable $q_i$ can be used to identify the actual or estimated amount of compression of the input image(s), which can be used by the machine learning model 602 during compression correction. For instance, the value 656 of the control variable $q_i$ can be used to control the amount of compression correction applied by the machine learning model 602.

One example benefit of this approach can be seen using a comparison to known approaches. The JPEG compression technique is a lossy compression technique used to compress digital images and was developed by the Joint Photographic Experts Group. The H.264 compression technique is a (typically) lossy compression technique used to compress digital videos and was standardized by the ITU-T Video Coding Experts Group. Each one of these compression techniques supports the use of multiple machine learning models, where different models can be used to decompress image or video data based on the estimated level of compression of the image or video data. The identification and use of the correct model is often important since clean-up for the effects of compression may be too heavy (in which case images appear flat and lose detail) or too low (in which case compression artifacts may still exist) if the wrong model is used. The approach shown in FIGS. 6A and 6B allows the machine learning model 602 to be used with various levels of compression, since the value 656 of the control variable $q_i$ used with specified image data 654 can be set based on the actual or estimated level of compression of the specified image data 654. As a result, a single machine learning model 602 can be used regardless of the level of compression.

Figure 7A:
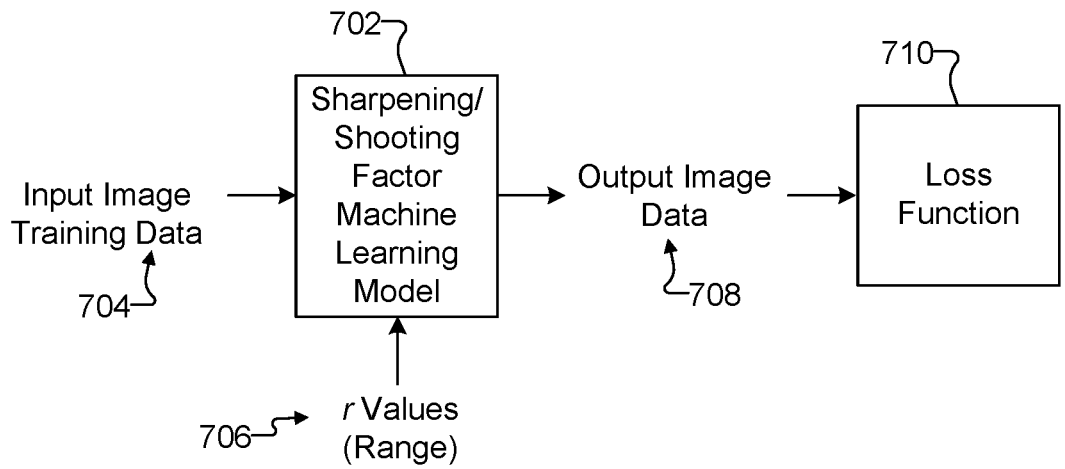
Figure 7B:
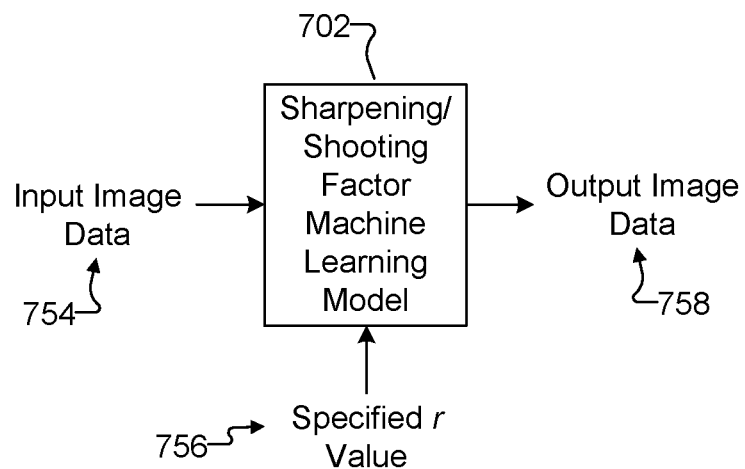

As shown in FIGS. 7A and 7B, a sharpening/shooting factor machine learning model 702 is trained and used to perform sharpening or shooting factor correction. Sharpening or shooting factor correction generally involves using the machine learning model 702 to process image data contained in input images (such as still or video images) in order to generate output images that are sharper or have better-defined edges and boundaries. Example applications for this functionality may be in digital cameras, video recorders, televisions, computers, satellite image processing systems, and other devices or systems where images are generated or otherwise obtained and then processed to produce sharper or more well-defined images.

In FIG. 7A, the machine learning model 702 is trained using input image training data 704, which may include both (i) training images containing less-defined image content and (ii) ground truth images containing better-defined image content. The machine learning model 702 is trained to process the input image training data 704 and a range of values 706 for a control variable denoted r (which is described below) in order to generate output image data 708. The machine learning model 702 can be trained so that the output image data 708 matches or closely matches the ground truth images. A loss function 710 can be used to calculates loss values for the machine learning model 702 during the training, where the loss values can indicate the losses or differences between the output image data 708 and the ground truth images. Ideally, parameters of the machine learning model 702 are modified during the training so that the loss values become increasingly smaller over time until at least a threshold loss level is achieved or some other criterion or criteria are met.

In some cases, the machine learning model 702 is trained by processing the input image training data 704 in order to sharpen or more clearly define edges and boundaries within the training images, such as for people, objects, and other contents in the training images. The machine learning model 702 can be trained to process the training images and enhance or sharpen the image contents, where the amounts of sharpening or other enhancements of the image data contained in the training images are defined by the control variable r. In some embodiments, the control variable r can be used to represent the amount of sharpening/shooting factor correction applied to each training image, and the amount of sharpening/shooting factor correction can affect how aggressively the machine learning model 702 sharpens the image contents. Varying the value 706 of the control variable r during training therefore trains the machine learning model 702 on how to enhance image contents to provide varying levels of sharpening/shooting factor correction.

In FIG. 7B, once the machine learning model 702 has been adequately trained, the machine learning model 702 can be placed into operation and used for inferencing. During inferencing, specified input image data 754 is provided to the machine learning model 702 along with a specified value 756 for the control variable r. The machine learning model 702 processes the specified input image data 754 and the specified value 756 for the control variable r in order to generate specified output image data 758 based on the input image data 754. The input image data 754 can generally correspond to one or more input images, and the output image data 758 can generally correspond to one or more output images having enhanced edges and boundaries. The value 756 of the control variable r can be used to control how much sharpening is used here with in the input image(s) by the machine learning model 702.

Figure 8A:
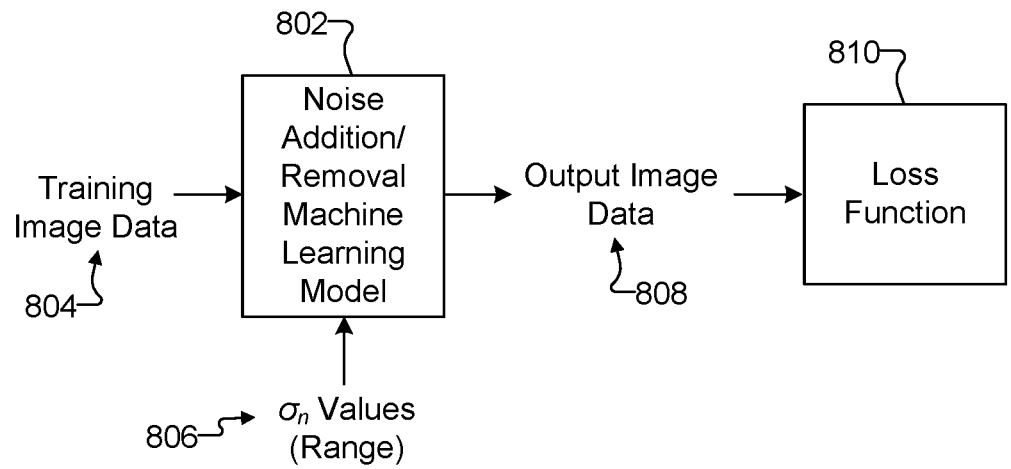
Figure 8B:
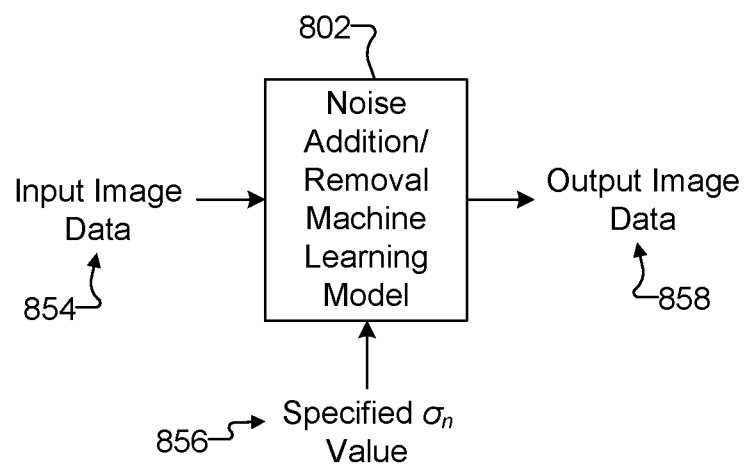

As shown in FIGS. 8A and 8B, a noise addition/removal machine learning model 802 is trained and used to perform noise addition/removal. Noise addition/removal generally involves using the machine learning model 802 to process image data contained in input images (such as still or video images) in order to add or remove noise, such as by adding noise to image data or by replacing image data representing noise with image data representing the scenes being imaged. Example applications for this functionality may be in digital cameras, video recorders, televisions, computers, satellite image processing systems, and other devices or systems where (i) images containing noise are captured or otherwise obtained and then processed to produce images with less or no noise or (ii) images containing no or low noise are captured or otherwise obtained and then processed to produce images containing additional noise. As counter-intuitive as it might seem, some applications may view the lack of noise as problematic, such as in the film industry where noise can be pleasing or otherwise viewed as desirable.

In FIG. 8A, the machine learning model 802 is trained using input image training data 804, which may include both (i) training images and (ii) ground truth images. The training images may contain more noise and the ground truth images may contain less or no noise, or the training images may contain less or no noise and the ground truth images may contain more noise. The machine learning model 802 is trained to process the input image training data 804 and a range of values 806 for a control variable denoted $\sigma_n$ (which is described below) in order to generate output image data 808. The machine learning model 802 can be trained so that the output image data 808 matches or closely matches the ground truth images. A loss function 810 can be used to calculates loss values for the machine learning model 802 during the training, where the loss values can indicate the losses or differences between the output image data 808 and the ground truth images. Ideally, parameters of the machine learning model 802 are modified during the training so that the loss values become increasingly smaller over time until at least a threshold loss level is achieved or some other criterion or criteria are met.

In some cases, the machine learning model 802 is trained by processing the input image training data 804 in order to add or remove noise from the training images. The machine learning model 802 can be trained to process the training images and perform noise addition or removal, where the desired amount or distribution of noise to be obtained within output images is defined by the control variable $q_n$. In some embodiments, the control variable $q_n$ can be used to represent the noise distribution factor of a Gaussian noise generator, and the Gaussian noise generator can be used to generate or identify the desired amount or distribution of noise in output images. Varying the value 806 of the control variable $q_n$ during training therefore trains the machine learning model 802 on how to add or remove noise with respect to input images.

In FIG. 8B, once the machine learning model 802 has been adequately trained, the machine learning model 802 can be placed into operation and used for inferencing. During inferencing, specified input image data 854 is provided to the machine learning model 802 along with a specified value 856 for the control variable $\sigma_n$. The machine learning model 802 processes the specified input image data 854 and the specified value 856 for the control variable $\sigma_n$ in order to generate specified output image data 858 based on the input image data 854. The input image data 854 can generally correspond to one or more input images, and the output image data 858 can generally correspond to one or more output images having more or less noise. The value 856 of the control variable $\sigma_n$ can be used to control the amount of noise added or removed by the machine learning model 802.

As can be seen here in these examples, the approaches described in this patent document enable a trained machine learning model to produce output data in a controllable manner. This functionality may therefore be used in a number of applications to provide controllable outputs from one or more machine learning models, which has generally been difficult if not impossible previously. As a particular example of a specific application, assume a machine learning model is being trained to estimate a person's appearance when he or she grows older. A training dataset may include a portrait dataset of different people, which can be grouped (for each person in the training dataset) into at least one pair of photos (a younger photo and an older photo). The machine learning model can be trained using the younger photos as training images and the older photos as ground truths, and an additional input can be defined to identify the number of years or other age difference between the younger and older photos of the person in each pair. Once trained, an image of a specified person can be provided to the machine learning model along with the number of years or other time period for aging the specified person, and the machine learning model can generate an estimate of what the specified person would look like after the time period has elapsed. By varying the time period, the machine learning model can generate different images of what the specified person might look like after different time periods.

Although FIGS. 3A through 8B illustrate examples of techniques for training and using controllable neural networks or other controllable machine learning models to perform various image processing operations, various changes may be made to FIGS. 3A through 8B. For example, each machine learning model may have one or multiple inputs for receiving values of one or more control variables. Also, the specific image processing operations discussed here are for illustration only, and any other suitable image processing operations may be performed in the same or similar manner. For instance, as noted above, other types of image processing operations may include object detection, object recognition, and image segmentation operations.

Figure 9:
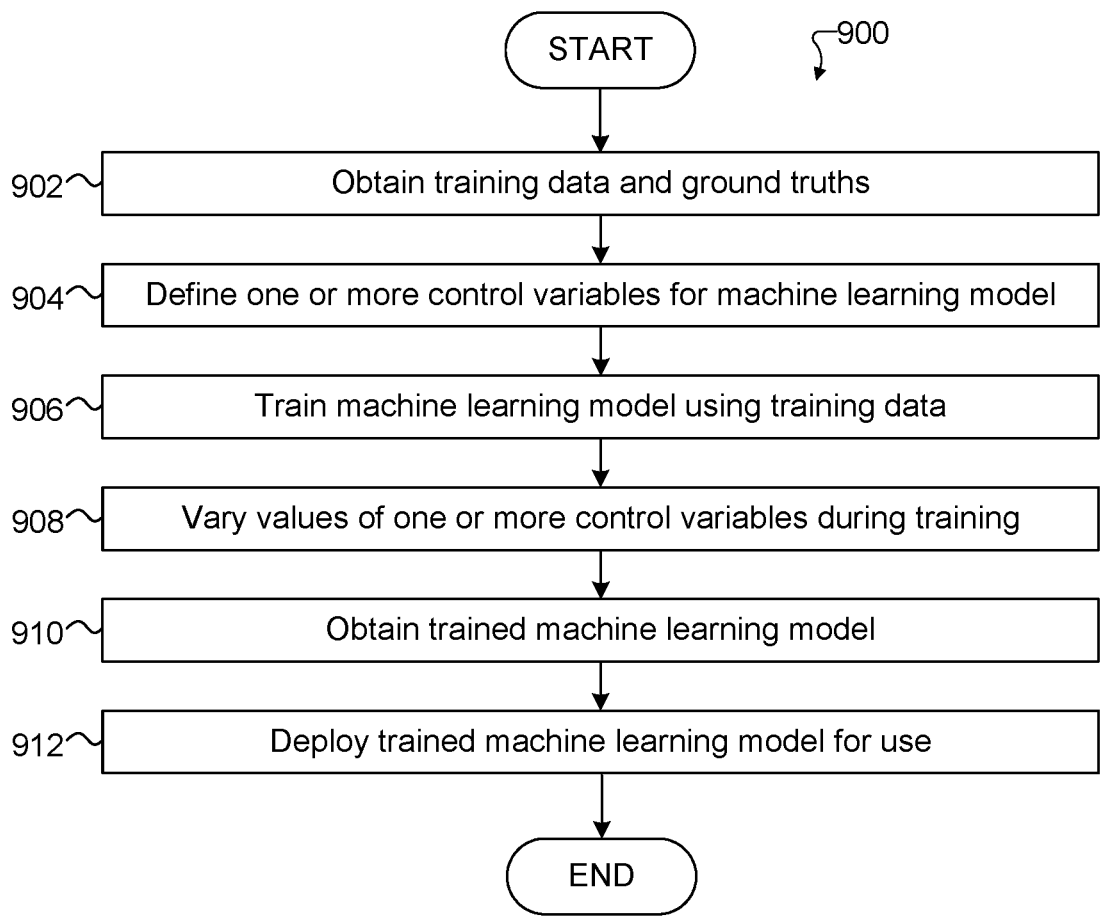
FIG. 9 illustrates an example method for training a controllable neural network or other controllable machine learning model according to this disclosure.

FIG. 9 illustrates an example method 900 for training a controllable neural network or other controllable machine learning model according to this disclosure. For ease of explanation, the method 900 is described as being performed by the electronic device 101, server 106, or other device(s) in the network configuration 100 of FIG. 1. However, the method 900 may be performed using any other suitable device(s) and in any other suitable system(s).

As shown in FIG. 9, training data and ground truths are obtained at step 902. This may include, for example, the processor 120 of the electronic device 101, server 106, or other device obtaining training data 204, such as by obtaining training images, time-series data, or other data and associated ground truths. The training data may be obtained from any suitable source(s) and have any suitable form(s) depending on the use of a machine learning model to be trained. One or more control variables for the machine learning model are defined at step 904. This may include, for example, the processor 120 of the electronic device 101, server 106, or other device defining one or more inputs for the machine learning model 202 to receive values 206, 256 of one or more control variables. In some cases, these steps may be performed based at least partially on user input.

The machine learning model is trained using the training data at step 906, and values of the one or more control variables are varied during the training at step 908. This may include, for example, the processor 120 of the electronic device 101, server 106, or other device providing the training data 204 and the varying values 206 of the one or more control variables to the machine learning model 202 and comparing output data 208 generated by the machine learning model 202 to the associated ground truths. This may also include the processor 120 of the electronic device 101, server 106, or other device determining loss values using the loss function 210 and, if necessary, adjusting parameters of the machine learning model 202 in a manner expected to reduce the loss values. This process can be repeated any number of times (possibly a very large number of times) to ideally cause the machine learning model 202 to generate output data 208 that is closer and closer to the ground truths. In some cases, the range over which the values 206 of each control variable can vary may be based at least partially on user input.

A trained machine learning model is obtained at step 910 and deployed for use at step 912. This may include, for example, the processor 120 of the electronic device 101, server 106, or other device continuing with the training of the machine learning model 202 until one or more specified criteria are met, such as until a suitably-low threshold loss level is achieved, a specified number of training iterations have occurred, or a specified time period for training has elapsed. This may also include the processor 120 of the electronic device 101, server 106, or other device placing the trained machine learning model 202 into use for inferencing or providing the trained machine learning model 202 to at least one other device for use during inferencing.

Although FIG. 9 illustrates one example of a method 900 for training a controllable neural network or other controllable machine learning model, various changes may be made to FIG. 9. For example, while shown as a series of steps, various steps in FIG. 9 may overlap, occur in parallel, occur in a different order, or occur any number of times. As a particular example, steps 906 and 908 can overlap or occur in parallel so that the values of the one or more control variables vary during the training.

Figure 10:
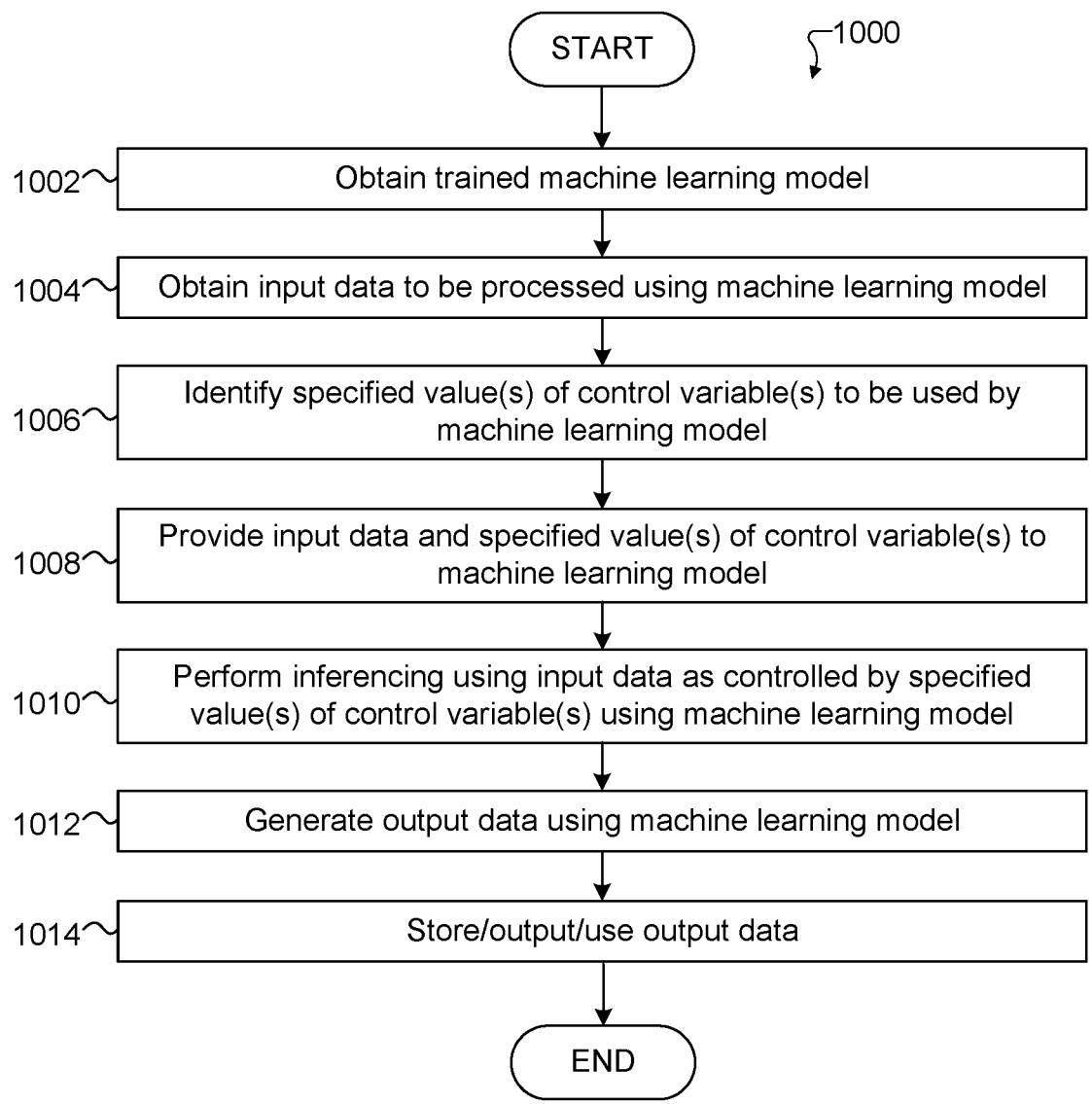
FIG. 10 illustrates an example method for using a controllable neural network or other controllable machine learning model according to this disclosure.

FIG. 10 illustrates an example method 1000 for using a controllable neural network or other controllable machine learning model according to this disclosure. For ease of explanation, the method 1000 is described as being performed by the electronic device 101, server 106, or other device(s) in the network configuration 100 of FIG. 1. However, the method 1000 may be performed using any other suitable device(s) and in any other suitable system(s).

As shown in FIG. 10, a trained machine learning model is obtained at step 1002. This may include, for example, the processor 120 of the electronic device 101, server 106, or other device generating the trained machine learning model 202 as discussed above with reference to FIG. 9 or obtaining the trained machine learning model 202 from another device that performs the method 900 of FIG. 9.

Input data to be processed using the machine learning model is obtained at step 1004. This may include, for example, the processor 120 of the electronic device 101, server 106, or other device obtaining the input data 252, such as by obtaining one or more input images, time-series data, or other data to be processed. The input data may be obtained from any suitable source(s) and have any suitable form(s) depending on the use of the machine learning model 202. One or more specified values for one or more control variables of the machine learning model are identified at step 1006. This may include, for example, the processor 120 of the electronic device 101, server 106, or other device identifying one or more specified values 256 to be used for the control variable(s) of the machine learning model 202. As discussed above with reference to FIGS. 3A through 8B, the specified value(s) 256 of the control variable(s) can be identified in various ways, some of which may depend on one or more characteristics of the input data 254 or one or more desired characteristics of output data 258 to be generated.

The input data and the one or more specified values of the control variable(s) are provided to the machine learning model at step 1008, and inferencing is performed by the machine learning model using the input data and the one or more specified values of the control variable(s) at step 1010. This may include, for example, the processor 120 of the electronic device 101, server 106, or other device providing the input data 254 and the value(s) 256 of the control variable(s) to the machine learning model 202. This may also include the processor 120 of the electronic device 101, server 106, or other device performing inferencing using the machine learning model 202 to process the input data 254, where the inferencing is controlled at least in part by the value(s) 256 of the control variable(s).

Output data is generated using the machine learning model at step 1012, and the output data is stored, output, or used in some manner at step 1014. This may include, for example, the processor 120 of the electronic device 101, server 106, or other device generating the output data 258, such as in the form of one or more output images, time-series data, or other output data. The output data 258 may have any suitable form(s) depending on the use of the machine learning model 202. This may also include the processor 120 of the electronic device 101, server 106, or other device displaying or otherwise presenting the output data 258 to one or more users, storing the output data 258 in a memory, communicating the output data 258 over at least one network to one or more destinations, or using the output data 258 in any other suitable manner.

Although FIG. 10 illustrates one example of a method 1000 for using a controllable neural network or other controllable machine learning model, various changes may be made to FIG. 10. For example, while shown as a series of steps, various steps in FIG. 10 may overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   obtaining, using at least one processor of an electronic device, a machine learning model trained to perform at least one image processing operation on image input data and to generate image output data over at least one range of values associated with one or more control variables, the machine learning model trained using a weighted combination of a plurality of loss functions including at least a first loss function corresponding to content loss, a second loss function corresponding to perceptual loss, and a third loss function corresponding to adversarial loss, wherein the one or more control variables relate to weighting of each of the plurality of loss functions within the weighted combination;
   providing, using the at least one processor, specified image input data to the machine learning model;
   providing, using the at least one processor, one or more specified values of the one or more control variables to the machine learning model, the one or more specified values of the one or more control variables within the at least one range of values; and
   performing inferencing using the machine learning model to process the specified image input data using the at least one image processing operation and generate specified image output data, wherein the inferencing is controlled based on the one or more specified values of the one or more control variables.

2. The method of claim 1, wherein the one or more control variables comprise one or more hyper-parameters added as one or more additional inputs to the machine learning model during training.

3. The method of claim 1, wherein performing the inferencing using the machine learning model comprises performing an image smoothing operation.

4. The method of claim 1, wherein the one or more control variables comprise a range of content loss weights, a range of perceptual loss weights, and a range of generative adversarial network (GAN) adversarial loss weights.

5. The method of claim 1, wherein the one or more specified values of the one or more control variables comprise a blur level applied during the at least one image processing operation.

6. The method of claim 1, wherein the one or more specified values of the one or more control variables comprise a compression level associated with an input image being processed during the at least one image processing operation.

7. The method of claim 1, wherein the one or more specified values of the one or more control variables comprise an input image quality index associated with an input image being processed during the at least one image processing operation.

8. The method of claim 1, wherein the at least one image processing operation comprises at least one of:
   a super-resolution operation in which the machine learning model processes image data from one or more input images to generate one or more higher-resolution output images;
   a detection operation in which the machine learning model processes the image data from the one or more input images to detect one or more objects within the one or more input images;
   a recognition operation in which the machine learning model processes the image data from the one or more input images to recognize the one or more objects within the one or more input images; and
   a segmentation operation in which the machine learning model processes the image data from the one or more input images to segment at least one of the one or more input images into multiple regions.

9. An apparatus comprising:
   at least one processing device configured to:
      obtain a machine learning model trained to perform at least one image processing operation on image input data and to generate image output data over at least one range of values associated with one or more control variables, the machine learning model trained using a weighted combination of a plurality of loss functions including at least a first loss function corresponding to content loss, a second loss function corresponding to perceptual loss, and a third loss function corresponding to adversarial loss, wherein the one or more control variables relate to weighting of each of the plurality of loss functions within the weighted combination;

provide specified image input data to the machine learning model;

provide one or more specified values of the one or more control variables to the machine learning model, the one or more specified values of the one or more control variables within the at least one range of values; and perform inferencing using the machine learning model to process the specified image input data using the at least one image processing operation and generate specified image output data, wherein the inferencing is controlled based on the one or more specified values of the one or more control variables.

10. The apparatus of claim 9, wherein the one or more control variables comprise one or more hyper-parameters added as one or more additional inputs to the machine learning model during training.

11. The apparatus of claim 9, wherein the at least one processing device is configured to use the machine learning model to perform an image smoothing operation.

12. The apparatus of claim 9, wherein the one or more control variables comprise a range of content loss weights, a range of perceptual loss weights, and a range of generative adversarial network (GAN) adversarial loss weights.

13. The apparatus of claim 9, wherein the one or more specified values of the one or more control variables comprise a blur level applied during the at least one image processing operation.

14. The apparatus of claim 9, wherein the one or more specified values of the one or more control variables comprise a compression level associated with an input image being processed during the at least one image processing operation.

15. The apparatus of claim 2, wherein the one or more specified values of the one or more control variables comprise an input image quality index associated with an input image being processed during the at least one image processing operation.

16. The apparatus of claim 9, wherein the at least one image processing operation comprises at least one of:
 a super-resolution operation in which the machine learning model processes image data from one or more input images to generate one or more higher-resolution output images;
 a detection operation in which the machine learning model processes the image data from the one or more input images to detect one or more objects within the one or more input images;
 a recognition operation in which the machine learning model processes the image data from the one or more input images to recognize the one or more objects within the one or more input images; and
 a segmentation operation in which the machine learning model processes the image data from the one or more input images to segment at least one of the one or more input images into multiple regions.

17. A non-transitory computer readable medium containing instructions that when executed cause at least one processor of an electronic device to:
 obtain a machine learning model trained to perform at least one image processing operation on image input data and to generate image output data over at least one range of values associated with one or more control variables, the machine learning model trained using a weighted combination of a plurality of loss functions including at least a first loss function corresponding to content loss, a second loss function corresponding to perceptual loss, and a third loss function corresponding to adversarial loss, wherein the one or more control variables relate to weighting of each of the plurality of loss functions within the weighted combination;
 provide specified image input data to the machine learning model;
 provide one or more specified values of the one or more control variables to the machine learning model, the one or more specified values of the one or more control variables within the at least one range of values; and
 perform inferencing using the machine learning model to process the specified image input data using the at least one image processing operation and generate specified image output data, wherein the inferencing is controlled based on the one or more specified values of the one or more control variables.

18. The non-transitory computer readable medium of claim 17, wherein the inferencing comprises an image smoothing operation.

19. The non-transitory computer readable medium of claim 17, wherein the one or more control variables comprise at least one of:
 a range of content loss weights, a range of perceptual loss weights, and a range of generative adversarial network (GAN) adversarial loss weights;
 a blur level applied during the at least one image processing operation;
 a compression level associated with an input image being processed during the at least one image processing operation; and
 an input image quality index associated with the input image being processed during the at least one image processing operation.

20. The non-transitory computer readable medium of claim 17, wherein the at least one image processing operation comprises at least one of:
 a super-resolution operation in which the machine learning model processes image data from one or more input images to generate one or more higher-resolution output images;
 a detection operation in which the machine learning model processes the image data from the one or more input images to detect one or more objects within the one or more input images;
 a recognition operation in which the machine learning model processes the image data from the one or more input images to recognize the one or more objects within the one or more input images; and
 a segmentation operation in which the machine learning model processes the image data from the one or more input images to segment at least one of the one or more input images into multiple regions.

21. A method comprising:
 providing, using at least one processor of an electronic device, training data to a machine learning model;

providing, using the at least one processor, values of one or more control variables to the machine learning model;

training the machine learning model using the training data and the values of the one or more control variables; and varying the values within at least one range of values associated with the one or more control variables during the training of the machine learning model in order to train the machine learning model to perform at least one image processing operation on image input data and to generate image output data over the at least one range of values associated with the one or more control variables, wherein the machine learning model is trained using a weighted combination of a plurality of loss functions including at least a first loss function corresponding to content loss, a second loss function corresponding to perceptual loss, and a third loss function corresponding to adversarial loss, wherein the one or more control variables relate to weighting of each of the plurality of loss functions within the weighted combination.

22. The method of claim 21, further comprising:

providing specified image input data and one or more specified values of the one or more control variables to the machine learning model, the one or more specified values of the one or more control variables within the at least one range of values; and performing inferencing using the machine learning model to process the specified image input data and generate specified image output data;

wherein the inferencing is controlled based on the one or more specified values of the one or more control variables.

23. The method of claim 21, wherein the one or more control variables comprise one or more hyper-parameters added as one or more additional inputs to the machine learning model during training.

24. The method of claim 21, wherein the machine learning model is trained to perform an image smoothing operation.

25. The method of claim 21, wherein the one or more control variables comprise a range of content loss weights, a range of perceptual loss weights, and a range of generative adversarial network (GAN) adversarial loss weights.

26. The method of claim 22, wherein the one or more specified values of the one or more control variables comprise a blur level applied during the at least one image processing operation.

27. The method of claim 22, wherein the one or more specified values of the one or more control variables comprise a compression level associated with an input image being processed during the at least one image processing operation.

28. The method of claim 22, wherein the one or more specified values of the one or more control variables comprise an input image quality index associated with an input image being processed during the at least one image processing operation.

29. The method of claim 21, wherein the at least one image processing operation comprises at least one of:

a super-resolution operation in which the machine learning model processes image data from one or more input images to generate one or more higher-resolution output images;

a detection operation in which the machine learning model processes the image data from the one or more input images to detect one or more objects within the one or more input images;

a recognition operation in which the machine learning model processes the image data from the one or more input images to recognize the one or more objects within the one or more input images; and a segmentation operation in which the machine learning model processes the image data from the one or more input images to segment at least one of the one or more input images into multiple regions.

* * * * *